United States Patent
Noda

(10) Patent No.: US 9,117,264 B2
(45) Date of Patent: Aug. 25, 2015

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Takeshi Noda, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 13/901,662

(22) Filed: May 24, 2013

(65) Prior Publication Data

US 2013/0322779 A1  Dec. 5, 2013

(30) Foreign Application Priority Data

Jun. 1, 2012  (JP) .................................. 2012-126542

(51) Int. Cl.
*G06K 9/40* (2006.01)
*G06T 5/00* (2006.01)
*G06T 5/10* (2006.01)

(52) U.S. Cl.
CPC . *G06T 5/002* (2013.01); *G06T 5/10* (2013.01); *G06T 2207/10116* (2013.01); *G06T 2207/20016* (2013.01); *G06T 2207/20056* (2013.01); *G06T 2207/30004* (2013.01)

(58) Field of Classification Search
USPC ......... 382/260, 261, 263, 264, 265, 275, 277, 382/280, 299, 300
See application file for complete search history.

(56) References Cited

U.S. PATENT DOCUMENTS

| | | | |
|---|---|---|---|
| 7,454,079 B2 | 11/2008 | Shinbata | |
| 8,355,594 B2 | 1/2013 | Noda | |
| 2002/0118887 A1* | 8/2002 | Gindele | 382/260 |
| 2009/0185057 A1* | 7/2009 | Lee et al. | 348/241 |
| 2011/0158550 A1 | 6/2011 | Noda | |

FOREIGN PATENT DOCUMENTS

| | | |
|---|---|---|
| JP | 4072491 A | 4/2008 |
| JP | 2011-028588 A | 2/2011 |
| JP | 2011-134118 A | 7/2011 |

\* cited by examiner

*Primary Examiner* — Phuoc Tran
(74) *Attorney, Agent, or Firm* — Fitzpatrick, Cella, Harper & Scinto

(57) ABSTRACT

An information processing apparatus has a decomposition unit that decomposes an image into multiple frequency component images, a reduction unit that reduces linear noise included in the frequent component images, and a reconstruction unit that reconstructs the frequency component images with reduced linear noise.

14 Claims, 5 Drawing Sheets

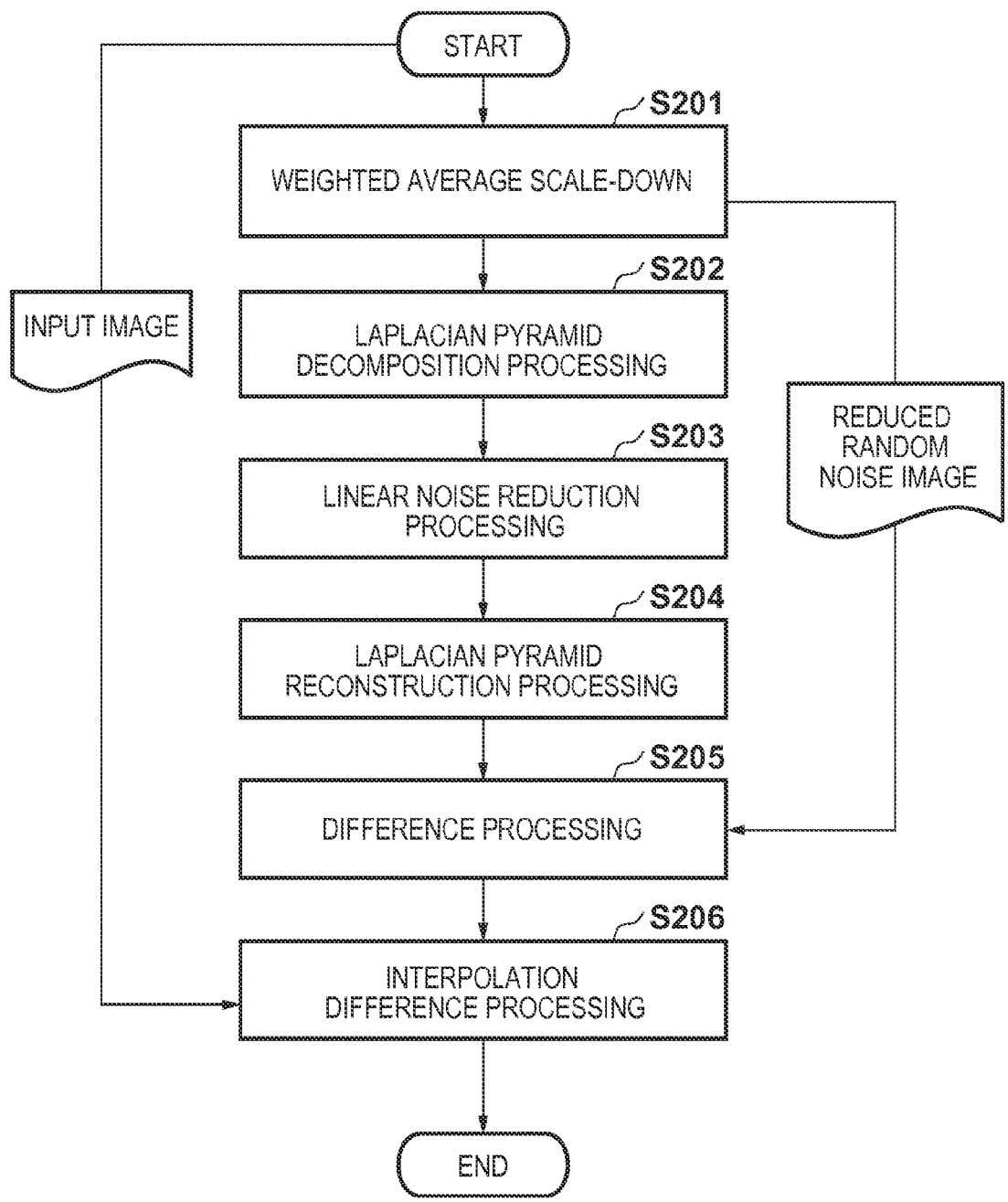

F I G. 4A
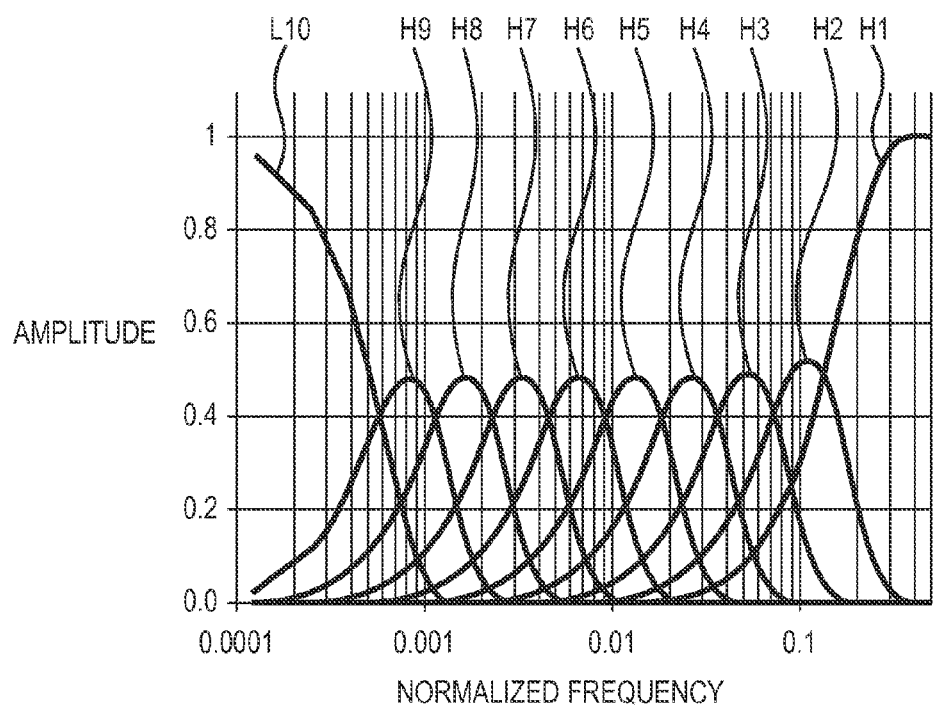
F I G. 4B
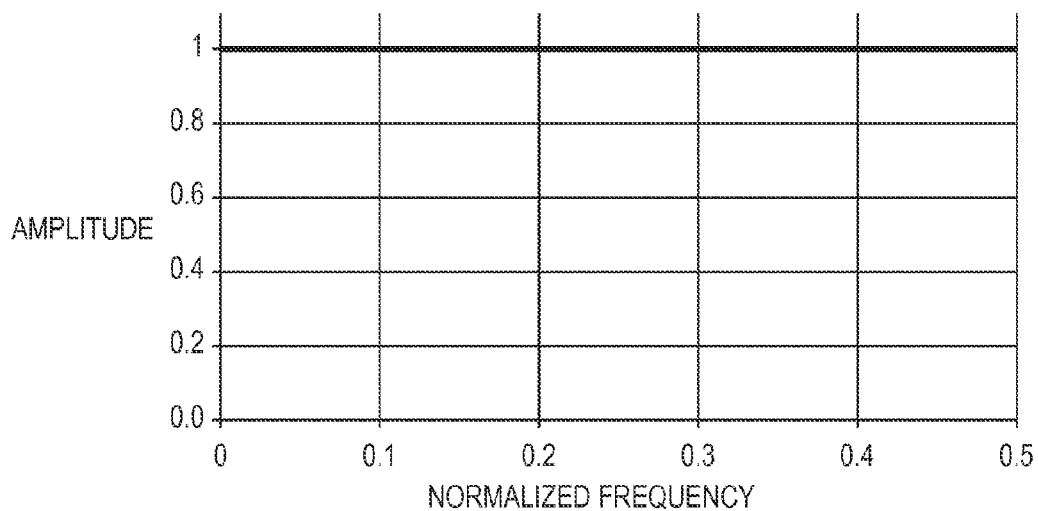

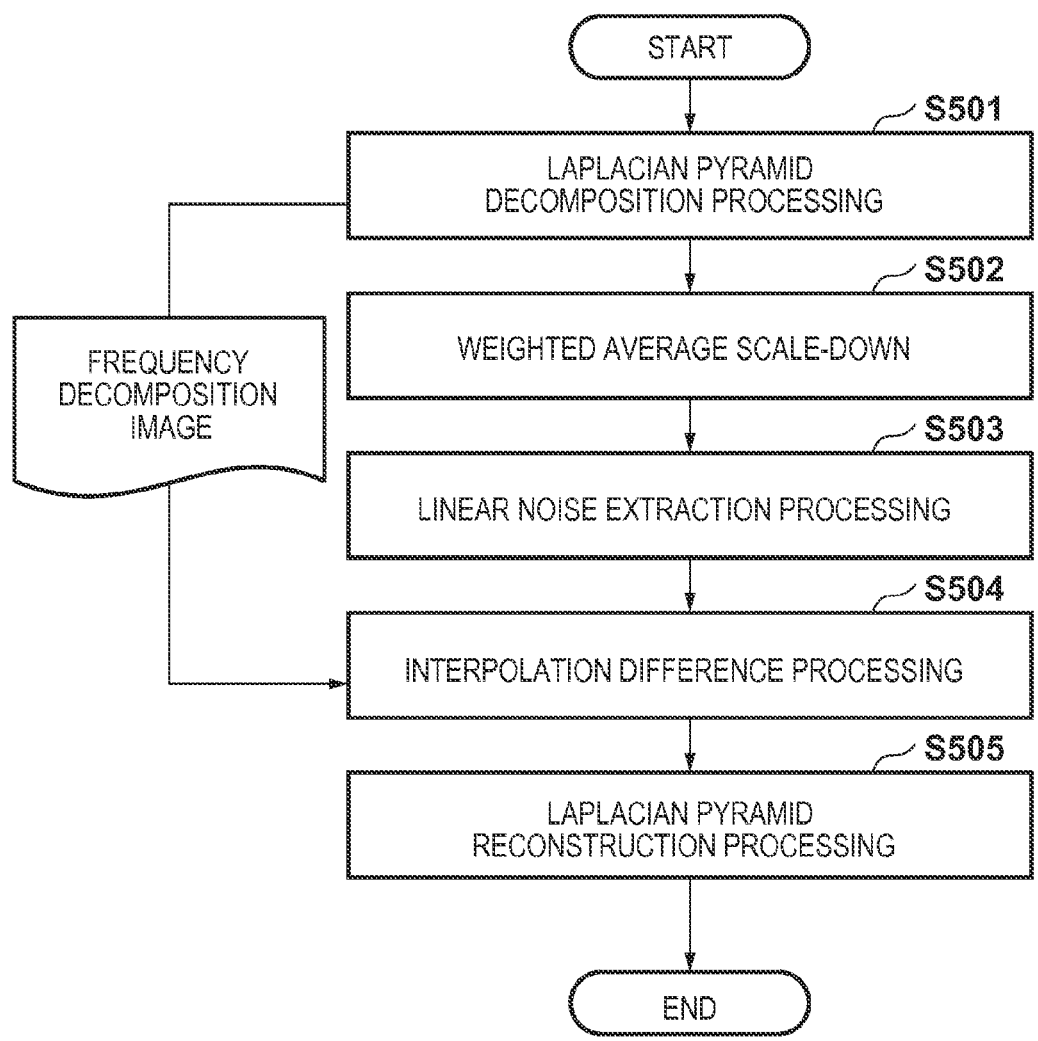

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, an information processing method, and a storage medium.

2. Description of the Related Art

Examinations and therapy based on capturing a moving image using radiation (e.g., X-rays) are actively performed in the medical field, and recently, X-ray imaging apparatuses that use a flat panel detector have come to be used frequently. Due to arranging photodiodes in an array, these flat panel detectors realize the flattening of an X-ray detection surface and resolve the problem of electro-optical warping that occurred with X-ray imaging apparatuses that use conventional image intensifiers. However, since flat panel detectors read, through long signal lines, signals photoelectrically converted by photodiodes, noise readily occurs in images due to the influence of external and internal factors.

Additionally, when capturing an image using radiation, low-dose capturing is required in order to reduce bodily exposure. Because of this, the signal to be read has an extremely small value, and even small fluctuations that occur in the image are visible. In particular, the human eye can acutely detect streaky unevenness (hereafter referred to as linear noise) that runs vertically and horizontally, and thus, the noise has a large effect on image quality during examination and therapy.

Conventionally, a technique using a spatial filter is known as a technique of reducing linear noise, as indicated in Japanese Patent Laid-Open No. 2011-028588. Japanese Patent Laid-Open No. 2011-028588 describes a technique in which the weighted average of an original image that includes linear noise is calculated to obtain an image having reduced random noise, and linear noise is extracted from the obtained image using a non-linear high pass filter. Then, a method is described in which the linear noise is reduced by subtracting the linear noise from the original image.

Additionally, Japanese Patent Laid-Open No. 2011-134118 discloses a method in which the weighted average of an original image that includes linear noise is calculated so as to obtain an image having reduced random noise, and then linear noise is reduced by linearly combining the obtained image with the original image and performing recursive processing in the time direction.

Additionally, Japanese Patent No. 4072491 discloses a method in which noise is reduced after decomposing an image into multiple frequency bands.

Japanese Patent Laid-Open No. 2011-028588 discloses a technique in which spatial filter processing is implemented on linear noise, which causes the linear noise to be reduced. In this case, the spatial filter can hold only a limited number of taps. Accordingly, it is difficult to handle low-frequency linear noise in spatial frequency bands at the same level as the object. As a result of this, low-frequency undulations remain in an image, which appear as flickering in a moving image.

Japanese Patent Laid-Open No. 2011-134118 discloses a technique in which recursive processing is performed in the direction of time, and therefore, it is possible to reduce low-frequency linear noise. However, since it takes time for a recursive filter to stabilize, it is difficult to reduce linear noise in the first 10 or so captured frames. Additionally, the technique disclosed in Japanese Patent Laid-Open No. 2011-134118 cannot be applied to still image capturing.

Japanese Patent No. 4072491 describes a technique in which reduction of random noise is performed by decomposing an image into multiple frequency bands. This technique enables the reduction of random noise in all frequency bands due to performing noise reduction processing on each frequency band. However, since it is not a technique that targets linear noise, it has little effect on reducing linear noise.

Additionally, as a person skilled in the art can easily envision, it is possible to reduce linear noise by performing filter processing after converting an image into frequency domains using high-speed Fourier transformation or the like. With this method, it is possible to perform processing of all frequency bands, but positional information of the image is lost when the image is converted into frequency domains. Since a non-linear filter such as an ϵ filter cannot be used as a result of this, it is difficult to separate the object and the noise.

The present invention provides a technique that can reduce linear noise in all spatial frequency bands in one image that is not readily influenced by random noise, and that does not readily influence the object.

SUMMARY OF THE INVENTION

According to one aspect of the present invention, there is provided an information processing apparatus comprising: a decomposition unit configured to decompose an image into a plurality of frequency component images; a reduction unit configured to reduce linear noise included in the frequency component images; and a reconstruction unit configured to reconstruct the frequency component images in which the linear noise was reduced.

According to another aspect of the present invention, there is provided an information processing apparatus comprising: a decomposition unit configured to decompose an input image into a plurality of frequency component images in a predetermined direction; a generation unit configured to generate an image by performing weighted average processing on the frequency component images in a direction that differs from the predetermined direction; an extraction unit configured extract a linear noise image along the differing direction by performing filter processing on the image that underwent weighted average processing; a difference image generation unit configured to generate a difference image by subtracting the linear noise image from the frequency component images; and a reconstruction unit configured to reconstruct the difference image.

According to the present invention, it is possible to obtain an image with reduced linear noise in all spatial frequency bands from one image that is not readily influenced by random noise and does not readily influence an object.

Further features of the present invention will become apparent from the following description of exemplary embodiments with reference to the attached drawings.

BRIEF DESCRIPTION OF THE DRAWINGS

FIG. 2 is a flowchart showing a procedure of the first embodiment.

FIGS. 4A and 4B are diagrams for describing frequency responses of decomposition according to a Laplacian pyramid.

FIG. 5 is a flowchart showing a procedure of s second embodiment.

DESCRIPTION OF THE EMBODIMENTS

First Embodiment

Figure 1:
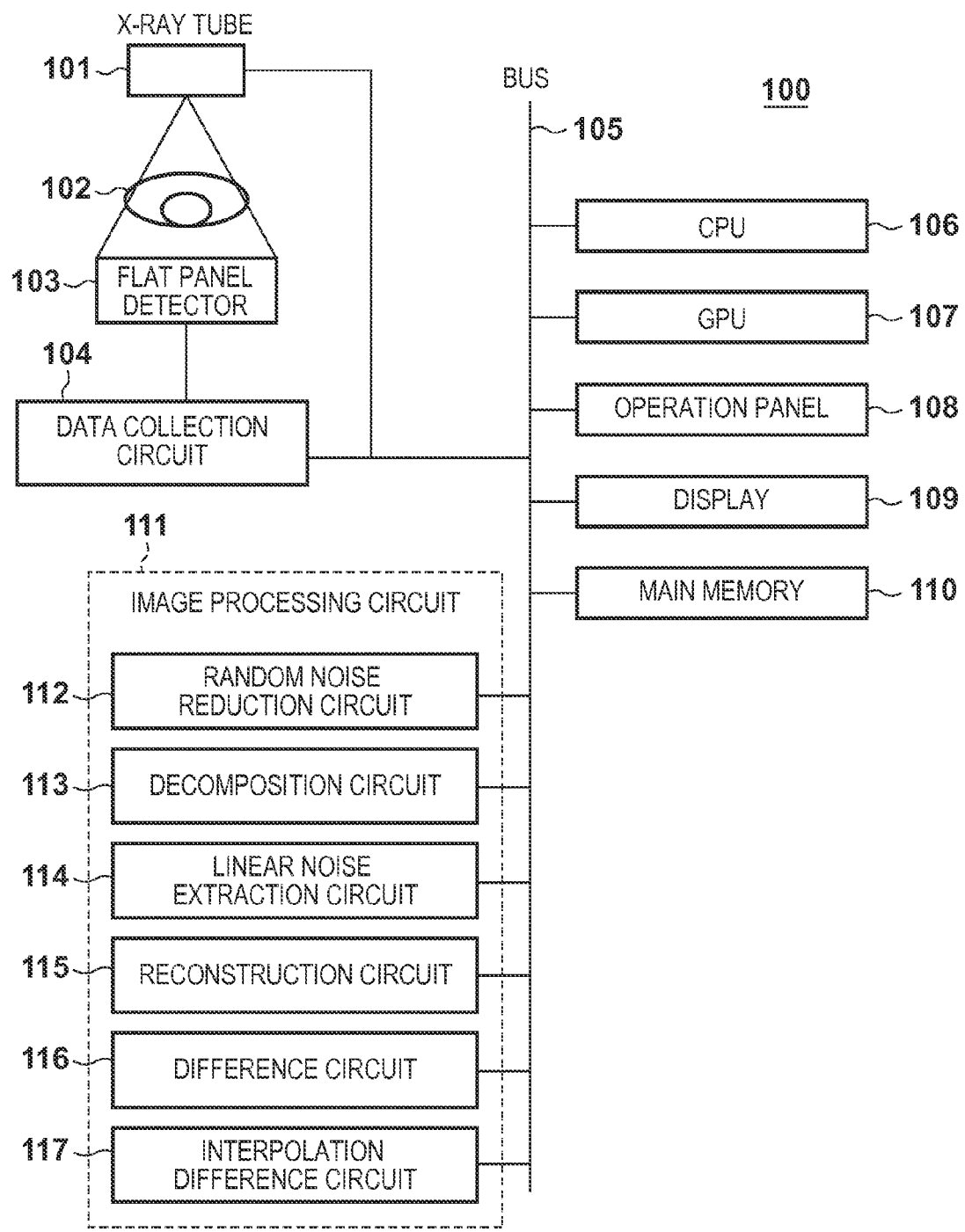
FIG. 1 is a diagram showing an example of a configuration of an information processing apparatus according to an embodiment of the present invention.

Embodiments of the present invention will be described below as examples with reference to the drawings. FIG. 1 is a diagram showing an example of a functional configuration of an information processing apparatus according to an embodiment of the present invention. An information processing apparatus 100 has a CPU 106, a main memory 110, an operation panel 108 that includes a keyboard or a touch panel, a display 109 that displays a processed image, and an image processing circuit 111. Additionally, the information processing apparatus 100 may have a graphics control unit such as a GPU 107 (Graphics Processing Unit), and a communication unit such as a network card. If the information processing apparatus 100 functions as an X-ray imaging apparatus, it also includes a data collection circuit 104 that controls an X-ray tube 101 and a flat panel detector 103 and thus captures an image of an object 102. Note that these constituent circuits are connected by a bus 105 and are controlled due to the CPU 106 executing a program stored in the main memory 110.

The image processing circuit 111 has a random noise reduction circuit 112, a decomposition circuit 113, a linear noise extraction circuit 114, a reconstruction circuit 115, a difference circuit 116, and an interpolation difference circuit 117. The random noise reduction circuit 112 generates an image with reduced random noise from an image. The decomposition circuit 113 decomposes an image into images in multiple frequency bands. The linear noise extraction circuit 114 performs random noise reduction processing on the decomposed images. The reconstruction circuit 115 reconstructs the decomposed images that have undergone random noise reduction processing. The difference circuit 116 subtracts the reconstructed image from the reduced random noise image and extracts a linear noise image. The interpolation difference circuit 117 performs interpolation difference processing on the image of linear noise using the original image.

Next, an operation of the info processing apparatus and an information processing method (linear noise reduction processing method) according to the first embodiment of the present invention will be described with use of the flowchart shown in FIG. 2.

First, the image captured with the flat panel detector 103 is transferred to the image processing circuit 111 via the bus 105 by the data collection circuit 104. Then, in step S201, the random noise reduction circuit 112 scales down the input image in a horizontal direction (horizontal scale-down) with respect to linear noise (in other words, parallel to linear noise) and calculates the weighted average of the pixel values. Here, the random noise reduction circuit 112 functions as a generation unit that generates an image obtained by performing weighted average processing on an input image in a predetermined direction (parallel to linear noise). For example, if the horizontal pixel count of the input image is scaled down from 1000 pixels to 100 pixels, the pixel value of one pixel of the scaled-down image is comprised of the average value of 10 pixels of the input image.

According to this operation, random noise is reduced to $1/\sqrt{10}$. The higher the reduction ratio is, the more random noise is reduced, and the easier it is to extract linear noise, but since linear noise also has a distribution in the horizontal direction, an appropriate reduction ratio is set to match the state of the linear noise. Additionally, if not limited by of the next and subsequent steps, the random noise may be reduced by smoothing the input image with a one-dimensional low-pass filter in the horizontal direction without performing horizontal scale-down.

Figure 3A:
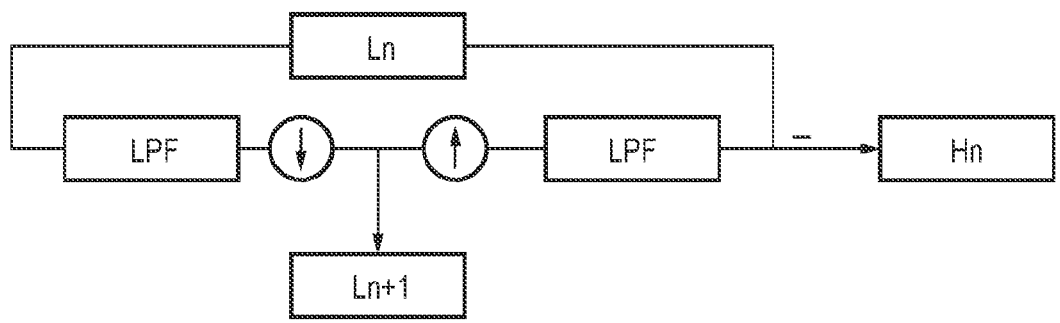
FIGS. 3A to 3C are diagrams for describing decomposition and reconstruction according to a Laplacian pyramid.
Figure 3B:
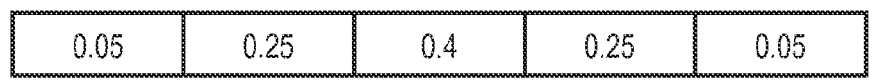
Figure 3C:
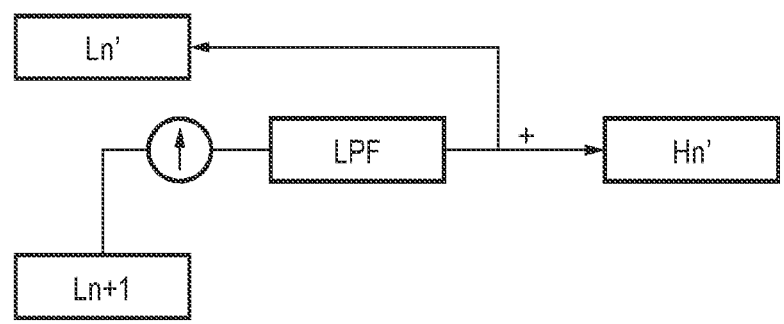

Next, in step S202, the decomposition circuit 113 (decomposition unit) one-dimensionally decomposes the reduced random noise image into multiple frequency bands in a direction perpendicular to the linear noise. In the present embodiment, a Laplacian pyramid is used for frequency decomposition. In FIGS. 3A to 3C, a conceptual diagram of frequency decomposition is shown. Processing to prevent aliasing is performed using a one-dimensional low pass filter, such as the one shown in FIG. 3B, with respect to a reduced random noise image L1 that is input to the decomposition circuit 113 (FIG. 3A), and a low-resolution image L2 can be obtained by downsampling to one-half. A high frequency component H1 can be obtained by upsampling the L2 by a factor of two, performing processing to prevent aliasing using the one-dimensional low pass filter (LPF), and calculating the difference from the reduced random noise L1 image. By sequentially performing the above-mentioned processing, n levels of low frequency component Ln images and high frequency component Hn images can be generated, and images in multiple frequency bands are generated. An example of the frequency responses of the frequency band images generated using a Laplacian decomposition is shown in FIG. 4A. If an image with a height of 1000 pixels is decomposed to L10, L10 is decomposed levels corresponding to several pixels. Additionally, the high frequency component Hn image of each level is a result of band-limiting the reduced random noise image L1. As shown in FIG. 4B, if all of the frequency decomposition components are overlayed, the amplitude is one in all of the bands, and the reduced random noise image L1 can be reproduced.

Next, in step S203, filter processing and linear noise reduction processing are carried out on the frequency decomposition images using the linear noise extraction circuit 114 and the difference circuit 116. Here, the linear noise extraction circuit 114 and the difference circuit 116 function as a reduction unit that reduces noise included in the frequency component images. The linear noise extraction circuit 114 extracts linear noise components from a low frequency component Ln image by using a non-linear filter (e.g., a one-dimensional ε filter) on the frequency-decomposed low frequency component Ln image of each level (filter processing). Linear noise of the frequency bands is reduced by subtracting these results from the high frequency component Hn images with the difference circuit 116 (linear noise reduction processing).

The non-linear filter is a filter in which the filter coefficient changes depending on the pixel values of an image. A one-dimensional ε filter (called an ε filter below), is a non-linear filter that compares the pixel value difference used in the filter, and when that difference is large, it attenuates the filter coefficient or sets it to zero. In filter processing, the filter coefficient changes according to the pixel value difference, and the amount of change in the filter coefficient varies according to the frequency decomposition level. In other words, when the difference between a central pixel image and a peripheral pixel image used in the filter is large, the edge components of the object (object components) can be saved by suppressing the influence of the filter through changing the filter coefficient. A normal ε filter is used as the low-pass filter and is expressed by Equation 1. Here, G is the filter coefficient, In(i) is the pixel image input to the filter, Out(i) is the pixel image output from the filter, F is a non-linear (piecewise linear) function, and output is controlled with the value ε as the threshold.

$$Out(i) = In(i) - \sum_{j=-h}^{h} G(j)F(In(i) - In(i+j))$$ Equation (1)

$$F(p) = p \text{ for } |p| < \varepsilon$$

$$F(p) = 0 \text{ for } |p| \geq \varepsilon$$

In the present embodiment, this filter is used as a high pass filter. In other words, if the output image is subtracted from the input image of the low pass filter, the filter becomes a high pass filter, and therefore, the ε high pass filter is expressed by Equation 2.

$$Out(i) = \sum_{j=-h}^{h} G(j)F(In(i) - In(i+j))$$ Equation (2)

The ε high pass filter can extract only noise without extracting edges, which indicate the object components. Accordingly, it can extract only linear noise without extracting the object components due to using an appropriate value, such as ε=3σ, according to the standard deviation σ of random noise.

Additionally, the filter coefficient G is equivalent to that shown in FIG. 3B, in which it is used in a Laplacian pyramid decomposition, or a value that has a slightly wide band is used. According to this, image bands that were band-limited by the frequency decomposition can be covered. Note that decomposition filters, MTM filters, bilateral filters, and the like are known as non-linear filters with similar functions, and these filters can also be used as non-linear high pass filters.

Additionally, aliasing processing is performed with use of a low pass filter in frequency decomposition, and therefore, the ε value of each level may be obtained, in consideration of the fact that the amplitude of linear noise is suppressed in accordance with Equation 3. Here, h is the coefficient of the low pass filter shown in FIG. 3B, and $\sigma_1$ is equal to the standard deviation σ of the linear noise of the input image.

$$\sigma_{N+1} = \sqrt{\Sigma h(j)^2 \sigma_N}$$ Equation (3)

Depending on the characteristics of the hardware in the flat panel detector 103 and the state of peripheral electromagnetic noise, a case can occur in which frequency components inherent in the linear noise become stronger. In this case, by appropriately (variably) setting the ε value in the frequency level, the filter coefficient corresponding to the frequency level is changed and effective linear noise extraction can be performed.

If the flat panel detector 103 has various driving modes, such as moving image, still image, binning, and frame rate, it is also effective to switch the ε value in conformity with the size of the linear noise in that driving mode.

Next, in step S204, the reconstruction circuit 115 (reconstruction unit) reconstructs the frequency decomposition images. This processing is carried out successively by upsampling the low frequency Ln+1 image of each frequency level as shown in FIG. 3C, processing those images with a low-pass filter (LPF) such as that shown in FIG. 3B, and adding them to Hn'. Here, Hn' is the high frequency component Hn image after having its linear noise removed with linear noise reduction processing. Accordingly, the reconstructed reduced random noise image L1' is an image in which linear noise in all frequency domains has been reduced.

Next, in step S205, the difference circuit 116 performs difference processing that subtracts the reduced random noise image reconstructed in the previous step S204 from the reduced random noise image (L1−L1'). The reconstructed reduced random noise image L1' is an image in which linear noise in all frequency domains has been reduced, and therefore, a linear noise image can be acquired (extracted) by the difference processing (L1−L1').

Finally, in step S206, the interpolation difference circuit 117 (difference image generation unit) subtracts the linear noise image acquired by the difference processing in step S205 from the input image. According to this, linear noise in all frequency bands can be reduced in the input image. If the linear noise image is scaled down, it may simply be subtracted from corresponding pixels out of the input image used during scale-down. For example, if the input image is 1000 pixels wide and the linear noise image is 100 pixels wide, the first to tenth pixels from the side of the input image are subtracted from the first pixel from the side of the linear noise image. Similarly, the eleventh to twentieth pixels from the input image may be subtracted from the second pixel from the side of the linear noise image.

According to the above processing, linear noise can be reduced across all frequency bands of an input image. According to this, it is possible to provide a moving image in which linear noise in the form of flickering that impedes diagnosis is reduced from the first frame of the moving image. Additionally, even in a still image, it is possible to provide an image that is of a higher definition than conventional techniques and in which linear noise is reduced in all frequency bands.

Second Embodiment

Next, the operation of an information processing apparatus, and an information processing method (a linear noise reduction processing method) according to a second embodiment of the present invention will be described in detail using FIG. 5. Portions redundant with the first embodiment will be omitted. Additionally, the functional configuration of the information processing apparatus is the same as the configuration in FIG. 1, which was described in the first embodiment, and therefore, a separate description will be omitted, and details of the present embodiment will be explained with reference to the constituent elements in FIG. 1.

First, the image captured with the flat panel detector 103 is transferred by the data collection circuit 104 to the image processing circuit 111 via the bus 105. Then, in step S501, the decomposition circuit 113 one-dimensionally decomposes the input image into multiple frequency bands. The method of frequency decomposition used here is similar to the method described in the first embodiment.

Next, in step S502, the random noise reduction circuit 112 scales down the low frequency components Ln of the frequency decomposition images in a horizontal direction (horizontal scale-down) with respect to the linear noise (in other words, parallel to the linear noise), and calculates the weighted average of the pixel image. The method of doing this is similar to the first embodiment, but in the present embodiment, the reduction ratio can be set variably with respect to each frequency component image. In other words, random noise is strongly suppressed by setting the reduction ratio at a higher level in frequency bands that have a smaller horizontal distribution of random noise. Additionally, the distribution of random noise is reflected in a scaled-down image due to setting the reduction ratio at a low level in frequency bands that have a large horizontal distribution of random noise. According to this, more effective linear noise extraction is possible in conformity with the horizontal distributions of linear noise in the frequency bands.

Note that, as described in the first embodiment, random noise may be reduced by smoothing the low frequency components Ln of the frequency decomposition images with the one-dimensional low pass filter, without performing a vertical scale-down. In such a case, it is sufficient that the pass band of the one-dimensional low pass filter is changed according to the distribution of linear noise of the frequency decomposition image.

Next, in step S503, a linear noise image is extracted from the low frequency component Ln of each frequency decomposition image with reduced random noise using the linear noise extraction circuit 114. The method of extracting the linear noise image is similar to that of the first embodiment. The linear noise extraction circuit 114 uses the non-linear filter on the low frequency components Ln of the frequency decomposition images that underwent weighted average processing, and extracts linear noise components from the low frequency component Ln images (filter processing).

Next, in step S504, the interpolation difference circuit 117 performs difference processing in which the linear noise image extracted in step S503 is subtracted from the high frequency components Hn of the frequency decomposition images. If the linear noise image is scaled down, it may simply be subtracted from corresponding pixels out of the input image used during scale-down. For example, if the high frequency component Hn image is 1000 pixels wide and the linear noise image is 100 pixels wide, the first to tenth pixels from the side of the high frequency component Hn image are subtracted from the first pixel from the side of the linear noise image. Similarly, the eleventh to twentieth pixels from the high frequency component Hn image may be subtracted from the second pixel from the side of the linear noise image. This generates a high frequency component Hn' image with reduced random noise.

Finally, in step S505, the reconstruction circuit 115 reconstructs the frequency decomposition images. Accordingly, the reconstructed reduced random noise image L1' is an image in which linear noise in all frequency domains has been reduced. The reconstruction method is the same as that of the first embodiment.

According to the above processing, linear noise can be reduced across all frequency bands of an input image. Additionally, even more effective processing to reduce linear noise can be performed due to giving additional consideration to the horizontal noise distribution of the linear noise of frequency bands, and a higher-quality image can be provided.

The above-mentioned are representative examples of embodiments according to the present invention, however the present invention is not limited to the embodiments described above or in the drawings, and can be implemented in suitable variations within a range that does not change the gist of the present invention. Additionally, the present invention can also take an embodiment as a system, apparatus, method, program, storage medium, or the like. Specifically, it may be applied to a system including multiple devices, and it may be applied to an apparatus composed of one device.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-126542, filed Jun. 1, 2012, which is hereby incorporated by reference herein in its entirety.

What is claimed is:

1. An information processing apparatus comprising:
   a generation unit configured to generate an image by performing weighted average processing on an image in a predetermined direction;
   a decomposition unit configured to decompose an image into a plurality of frequency component images, wherein the decomposition unit performs frequency decomposition on the image that has undergone weighted average processing;
   a reduction unit configured to reduce linear noise included in the frequency component images;
   a reconstruction unit configured to reconstruct the frequency component images in which the linear noise was reduced; and
   a second generation unit configured to generate an image, based on the image that underwent weighted average processing and the reconstructed image, by subtracting a linear noise image from the input image.

2. The information processing apparatus according to claim 1, wherein the decomposition unit decomposes the input image into the plurality of frequency component images in the predetermined direction.

3. The information processing apparatus according to claim 2, wherein the predetermined direction differs from a direction of adding in the weighted average processing.

4. The information processing apparatus according to claim 1, comprising:
   an extraction unit configured to subtract the reconstructed image from the image that underwent weighted average processing and extract the linear noise image along the predetermined direction; and
   a difference image generation unit configured to generate a difference image by subtracting the linear noise image from the input image.

5. An information processing apparatus comprising:
   a decomposition unit configured to decompose an input image into a plurality of frequency component images in a predetermined direction;
   a generation unit configured to generate an image by performing weighted average processing on the frequency component images in a direction that differs from the predetermined direction;
   an extraction unit configured extract a linear noise image along the differing direction by performing filter processing on the image that underwent weighted average processing;

a difference image generation unit configured to generate a difference image by subtracting the linear noise image from the frequency component images; and a reconstruction unit configured to reconstruct the difference image.

6. The information processing apparatus according to claim 5, wherein the filter processing is performed with use of a non-linear filter in which a filter coefficient changes depending on an image pixel value.

7. The information processing apparatus according to claim 5, wherein in the filter processing, a filter coefficient changes according to a pixel value difference, and the amount of change of the filter coefficient is variable according to a level of decomposition.

8. The information processing apparatus according to claim 5, wherein the filter processing is performed using one of an $\epsilon$ filter, a dispersion filter, an MTM filter, and a bilateral filter as a high pass filter.

9. The information processing apparatus according to claim 1, wherein the generation unit generates an image by scaling down the input image through the weighted average processing.

10. The information processing apparatus according to claim 5, wherein the generation unit variably sets a reduction ratio for each of the frequency component images and generates images by scaling down the frequency component images.

11. An information processing method that reduces linear noise and is executed with an information processing apparatus, comprising:

a generation step of generating an image by performing weighted average processing on an input image in a predetermined direction;

a decomposition step of decomposing, in a direction that differs from the predetermined direction, the image that underwent weighted average processing into a plurality of frequency component images;

a reduction step of reducing linear noise included in the frequency component images by performing filter processing on the frequency component images;

a reconstruction step of reconstructing the frequency component images in which linear noise was reduced;

an extraction step of subtracting the reconstructed image from the image that underwent weighted average processing, and extracting a linear noise image along the predetermined direction; and a difference image generation step of generating a difference image by subtracting the linear noise image from the input image.

12. An information processing method that reduces linear noise and is executed with an information processing apparatus, comprising:

a decomposition step of decomposing, in a predetermined direction, an input image into a plurality of frequency component images;

a generation step of generating an image by performing weighted average processing on the frequency component images in a direction that differs from the predetermined direction;

an extraction step of extracting a linear noise image along the differing direction by performing filter processing on the image that underwent weighted average processing;

a difference image generation step of generating a difference image by subtracting the linear noise from the frequency component images; and a reconstruction step of reconstructing the difference image.

13. A non-transitory computer-readable storage medium storing a computer program which makes a computer execute an information processing method according to claim 11.

14. A non-transitory computer-readable storage medium storing a computer program which makes a computer execute an information processing method according to claim 12.

* * * * *